(12) United States Patent
Chang et al.

(10) Patent No.: US 7,427,144 B2
(45) Date of Patent: Sep. 23, 2008

(54) DIRECT TYPE BACKLIGHT MODULE

(75) Inventors: Shao-Han Chang, Tu-cheng (TW); Li-Zhou Shi, Shenzhen (CN); Hua-Dong Zou, Shenzhen (CN); Yu-Ya Liu, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 29 days.

(21) Appl. No.: 11/505,561

(22) Filed: Aug. 16, 2006

(65) Prior Publication Data

US 2007/0153496 A1    Jul. 5, 2007

(30) Foreign Application Priority Data

Dec. 30, 2005   (CN) .................. 2005 1 0121401

(51) Int. Cl.
*F21S 4/00*   (2006.01)
*G01D 11/28*   (2006.01)

(52) U.S. Cl. .................. 362/225; 362/29; 362/30

(58) Field of Classification Search .................. 362/29, 362/30, 614, 633, 634, 225, 260, 396, 652, 362/97, 613, 457

See application file for complete search history.

(56) References Cited

U.S. PATENT DOCUMENTS

| | | | | |
|---|---|---|---|---|
| 7,207,710 | B2* | 4/2007 | Kim | 362/634 |
| 7,287,895 | B2* | 10/2007 | Lin et al. | 362/633 |
| 2002/0149713 | A1* | 10/2002 | Ishida et al. | 349/58 |
| 2006/0103775 | A1* | 5/2006 | Chung | 349/58 |

FOREIGN PATENT DOCUMENTS

| | | |
|---|---|---|
| CN | 1637510 A | 7/2005 |
| CN | 1658447 A | 8/2005 |
| JP | 11-191310 | 7/1999 |

* cited by examiner

*Primary Examiner*—Sharon Payne
*Assistant Examiner*—Sean P Gramling
(74) *Attorney, Agent, or Firm*—Morris Manning Martin LLP; Tim Tingkang Xia, Esq.

(57) ABSTRACT

A direct type backlight module (30) includes a base (21), at least two lamp-fixing units (22) and at least one lamp tube (20). Each lamp-fixing unit is disposed on each corresponding opposite ends of the base. Each lamp-fixing unit includes a bottom board (222) and at least one clip element (224) formed on the bottom board. The lamp tube includes two electrodes defined at two ends thereof and two electrode holders (202) receiving the two electrodes respectively. The electrode holders of the lamp tube are fixed in the corresponding clip elements of the two lamp-fixing units, thus the lamp tube are mounted into the two aligned lamp-fixing units. In the present backlight module, the lamp tubes can be fixed into the clip elements tightly and also easily dissembled from the clip elements of the lamp-fixing units.

14 Claims, 5 Drawing Sheets

DIRECT TYPE BACKLIGHT MODULE

TECHNICAL FIELD

The present invention relates to backlight modules, more particularly, to direct type backlight modules for use in, for example, a liquid crystal display (LCD).

BACKGROUND

In a liquid crystal display device, a liquid crystal is a substance that does not itself illuminate light. Instead, the liquid crystal relies on light received from a light source, thereby displaying images and data. In the case of a typical liquid crystal display, a backlight module powered by electricity supplies the needed light.

Generally, backlight modules can be classified into an edge lighting type or a bottom lighting type based upon the location of lamps within the devices. The edge lighting type backlight module has a lamp unit arranged at a side portion of a light guiding plate for guiding light. The edge lighting type backlight modules are commonly employed in small-sized LCD due to their lightweight, small size, and low electricity consumption. A bottom lighting type backlight module has a plurality of lamps arranged at regular positions to directly illuminate an entire surface of an LCD panel. The bottom lighting type backlight modules have a higher efficiency of light usage and a longer operational lifetime than the edge lighting type backlight modules, the bottom lighting type backlight modules are especially used in large-sized LCD devices.

Referring to FIG. 8, a typical direct type backlight module 1 is shown. The backlight module 1 includes a plurality of lamp tubes 10 and a lamp housing 11. Each lamp tube 10 includes two electrodes (not shown) defined at two ends thereof and two electrode holders 102 receiving the two electrodes respectively. The lamp housing 11 includes a base 110, a plurality of side protrusions 112 protruding out from two corresponding opposite edges of the base 110, the side protrusions 112 being disposed apart side by side, and a plurality of cutouts 114 each defined in the base 110 between two adjacent side protrusions 112. The cutouts 114 are used to receive the electrode holders 102 defined by the lamp tubes 10, thus each lamp tube 10 is positioned between the two corresponding adjacent side protrusions 112.

However, the side protrusions 112 are formed of thin metal sheet. This results in that the side protrusions 112 can easily be distorted or twisted by an exterior force or sudden impact. Therefore, a mechanical intensity of the lamp housing 11 can be insufficient. In addition, although the structures of the lamp housing 11 helps to position the lamp tubes 10 in a parallel formation, the lamp tubes 10 are not fixed to the lamp housing 11 tightly. This results in that the lamp tubes 10 can easily be damaged by a sudden impact.

What is needed, therefore, is a direct type backlight module that overcome the above mentioned disadvantage.

SUMMARY

A backlight module according to a preferred embodiment includes a base, at least two lamp-fixing units and at least one lamp tube. Each lamp-fixing unit is disposed on each corresponding opposite ends of the base. Each lamp-fixing unit includes a bottom board and at least one clip element formed on the bottom board. The lamp tube includes two electrodes defined at two ends thereof and two electrode holders receiving the two electrodes respectively. The lamp tube with the electrode holders is secured in between the two aligned lamp-fixing units.

Other advantages and novel features will become more apparent from the following detailed description of the preferred embodiments, when taken in conjunction with the accompanying drawings.

BRIEF DESCRIPTION OF THE DRAWINGS

Many aspects of the present direct type backlight module can be better understood with reference to the following drawings. The components in the drawings are not necessarily drawn to scale, the emphasis instead being placed upon clearly illustrating the principles of the present direct type backlight module. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present direct type backlight module, in detail.

Figure 1:
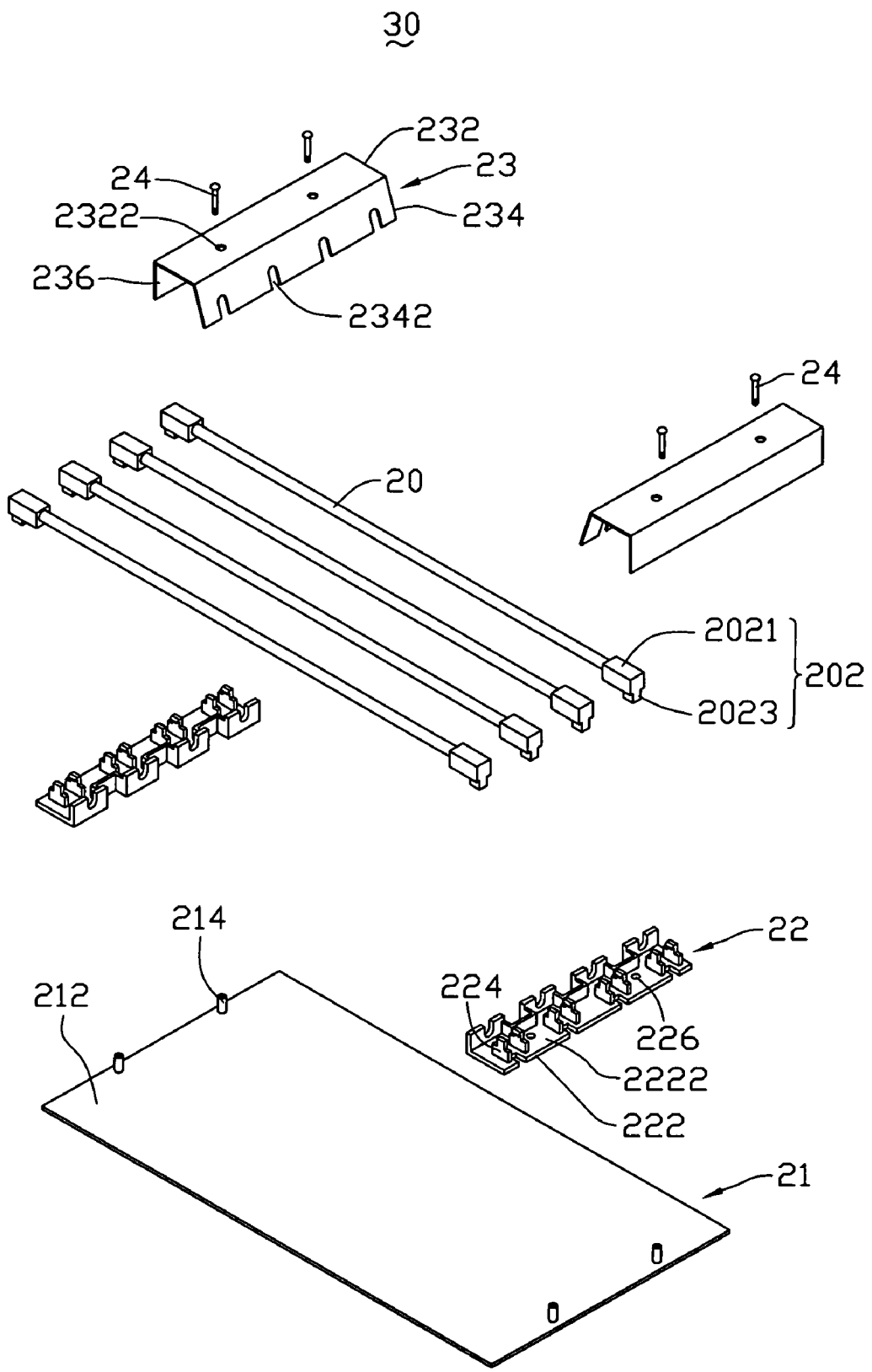
FIG. 1 is a schematic, exploded isometric view of a backlight module according to a first preferred embodiment.

Referring to FIG. 1, a direct type backlight module 30 in accordance with a first preferred embodiment is shown. The backlight module 30 includes a base 21, a plurality of lamp tubes 20, two lamp-fixing units 22, and two lamp-protecting units 23. Each lamp-fixing unit 22 is disposed on each corresponding opposite ends of the base 21. The lamp tubes 20 are secured in between the two aligned lamp-fixing units 22. Each two lamp-protecting units 23 are correspondingly positioned on the each lamp-fixing units 22 for covering the two lamp-fixing units 22 and to protect the electrode holders 202 of the lamp tubes 20.

The base 21 is a rectangular plane board. The base 21 includes a reflective surface 212 and a plurality of fixing columns 214 disposed at two corresponding opposite ends of the reflective surface 212.

Each lamp tube 20 includes two electrodes (not shown) defined at two ends thereof and two corresponding electrode holders 202 receiving the two electrodes. The electrode holders 202 are formed of dielectric materials, such as rubber. The electrode holders 202 could also help to decrease the risk of damaging the lamp tube 20. Each electrode holder 202 has an L-shaped structure having a main portion 2021 and a secondary portion 2023. The main portion 2021 of the electrode holder 202 receives the electrode of the lamp tube 20, and a lead wire (not shown) connecting the electrode of the lamp tube 202 is drawn out from the secondary portion 2023 of the electrode holder 202. The lamp tube 20 could be selected from a group comprising of a cold cathode fluorescent lamp, a field emission lamp tube, and/or other suitable linear lamps. In this embodiment, the lamp tubes 20 are cold cathode fluorescent lamps.

Each lamp-fixing unit 22 includes a bottom board 222, a plurality of clip elements 224, and a plurality of first positioning holes 226. The bottom board 222 is an elongated sheet, furthermore, the bottom board 222 is in contact with the base 21. A length of the bottom board 222 is configured to match with the corresponding ends of the base 21 with the fixing columns 214. The clip elements 224 are aligned at predetermined intervals along the bottom board 222.

Figure 2:
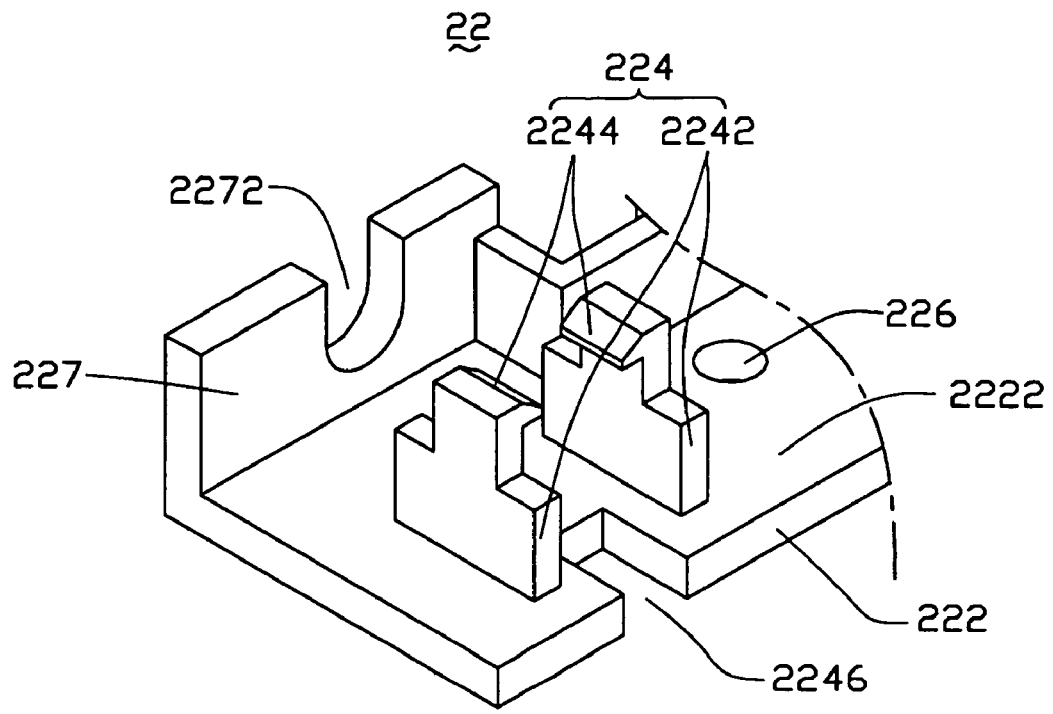
FIG. 2 is an enlarged, partially isometric view of a lamp-fixing unit of FIG. 1.
Figure 3:
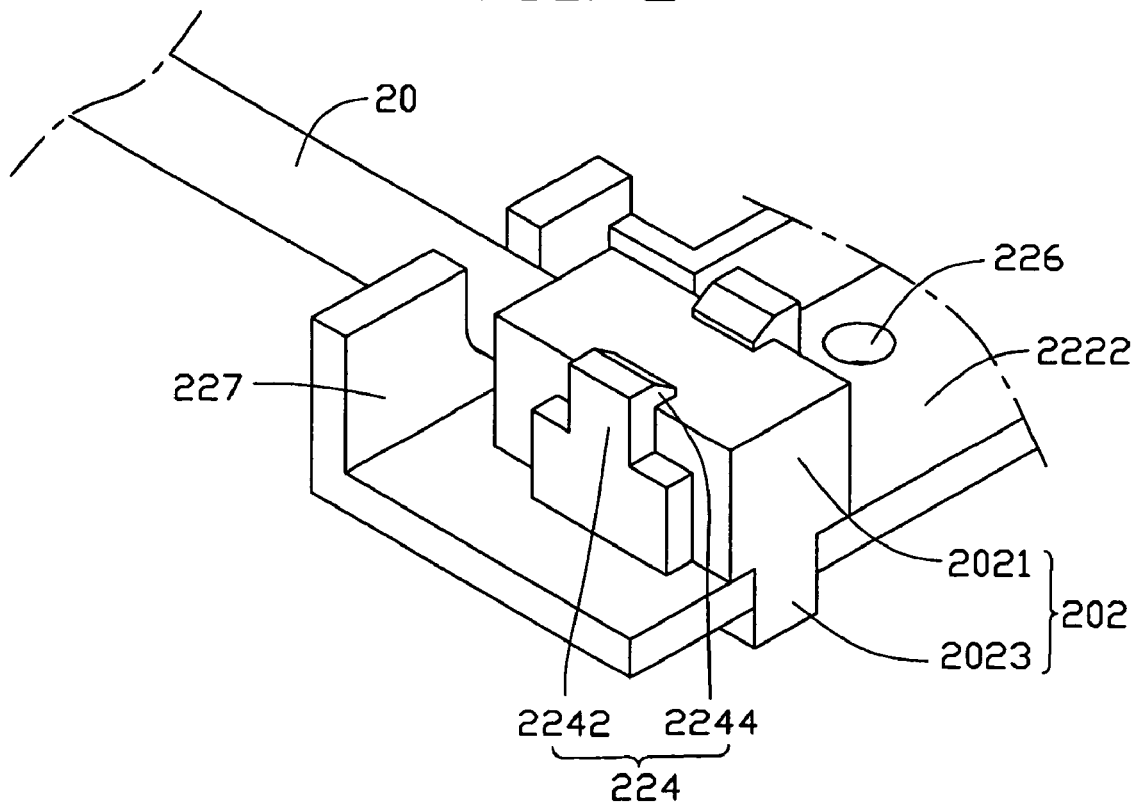
FIG. 3 is an enlarged, partially isometric view of the lamp-fixing unit assembled with a lamp tube of FIG. 1.

Referring to FIGS. 2 and 3, each clip element 224 is used to fix the electrode holder 202 of the lamp tube 20 on the lamp-fixing unit 22. Each clip element 224 includes two elastic protruding walls 2242 and two barbs or pressing blocks 2244. The two elastic protruding walls 2242 that extend out from the bottom board 222 are positioned apart and parallel to each other. Each pressing block 2244 extends out from a top of the elastic protruding wall 2242 towards each other, thus, the two pressing blocks 2244 faces each other. In this embodiment, each pressing block 2244 has a trapezoid-form cross-section taken along a plane in a direction parallel to its extending direction that cuts through the center of each pressing block 2244. The first positioning holes 226 are defined in the bottom board 222 between the clip elements 224 corresponding to the fixing columns 214.

Each lamp-fixing unit 22 may further include a supporting sidewall 227 extending out in the same direction of the two elastic protruding walls 2242 from an inner edge of the bottom board 222 perpendicular to the bottom board 222. The supporting sidewall 227 defines a plurality of first U-shaped openings 2272 therein corresponding to each clip element 224, so as to support the corresponding lamp body of the lamp tubes 20. In this embodiment, the lamp-fixing unit 22 further includes a plurality of rectangular openings 2246 defined adjacent to an outer edge of the bottom board 22 between the two elastic protruding walls 2242 of each clip element 224. The rectangular opening 2246 is configured for receiving the secondary portions 2023 of the electrode holders 202 when the lamp tubes 20 are fixed into the clip elements 224.

In this embodiment, a distance between the two elastic protruding walls 2242 of each clip element 224 is configured to be equal to a width of the electrode holder 202. This is for fixing the lamp tubes 20 tightly and limiting the lamp tubes 20 to move horizontally between the two elastic protruding walls 2242. A height of the pressing block 2244 relative to the bottom board 222 is configured to be equal to that of the electrode holder 202. This is for limiting the lamp tubes 20 to move along a direction perpendicular to the bottom board 222. The elastic protruding walls 2242 could be bent a little toward a direction parallel to the bottom board 222 by introducing an exterior force that pushes the two pressing block 2244 of the clip element 24 away from each other, this results in that the lamp tubes 20 could be easily pressed into the clip elements 224.

Referring also to FIG. 1, in this embodiment, the backlight module 30 has four lamp tubes 20. Each lamp-fixing unit 22 has four clip elements 224. It is noted that the scope of the present backlight module is not limited to those described in the embodiment even though the numbers and shapes of the clip element 224, and the lamp tubes 20 are illustrated specifically.

Each lamp-protecting unit 23 includes an upper board 232, a first sidewall 234, and a second sidewall 236. The first sidewall 234 and the second sidewall 236 are connected on each side of two opposite edges of the upper board 232. A size of the upper board 232 is configured to be larger than or equal to that of the bottom board 212. The first sidewall 234 defines a plurality of second U-shaped openings 2342 therein according to the lamp tubes 20. The first sidewall 234, the second sidewall 236 and the upper board 232 collectively define a cover substantially covering the lamp-fixing unit 22, and the lamp tubes 20 are passed through the second U-shaped openings 2342. The upper board 232 also defines a plurality of second positioning holes 2322 therein corresponding to the fixing columns 214 and first positioning holes 226. The lamp-protecting unit 23 and the lamp-fixing unit 22 are both fixed to the base 21 tightly by mounting the fixing columns 214 through the corresponding first positioning hole 226. Furthermore the fixing columns 214 are locked with a plurality of screws 24 through second positioning holes 2322.

Figure 4:
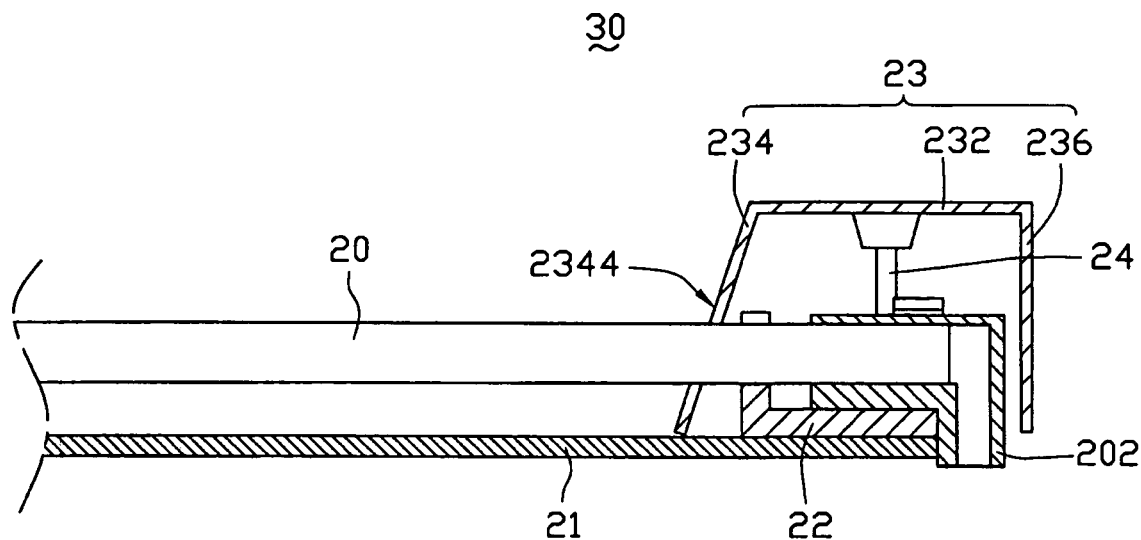
FIG. 4 is a schematic, partially cross-sectional view of the backlight module of FIG. 1.

Referring to FIG. 4, in this embodiment, in order to improve a light energy utilization rate, an inclination angle defined by the first sidewall 234 with respect to the upper board 232 is configured to be an obtuse angle. In addition, a surface 2344 facing an inner area of the backlight module 30 is a reflective surface, so as to reflect more of light rays emitted from the lamp tubes 20 towards a liquid crystal panel (not shown) disposed on the lamp-protecting unit 23.

In other exemplary embodiment, a width of a portion of the elastic protruding wall 2242 adjacent to the pressing block 2244 is configured to be smaller than that of a bottom of the elastic protruding wall 2242, thereby exposing more outer surfaces of the electrode holder 202 to be grasped when disassembling, thus the lamp tubes 20 may be detached from the clip elements 224 easily.

In assembling, firstly, inserting a plurality of fixing columns 214 of the base 21 through the first positioning holes 226 of the two lamp-fixing units 22 correspondingly, thus positioning one lamp-fixing unit 22 on each of the two opposite ends of the base 21; secondly, the two ends of each lamp tube 20, coupled with the electrode holders 202, are pressed into the corresponding clip elements 224 of the two opposite lamp-fixing units 22, thus each lamp tubes 20 is fixed between the two elastic protruding walls 242 tightly and is limited by the pressing blocks 2244; thirdly, the two lamp-protecting units 23 are correspondingly positioned on the two lamp-fixing units 22, and are locked to the correspondingly lamp-fixing units 22 and the base 21 with the screws 24.

Figure 5:
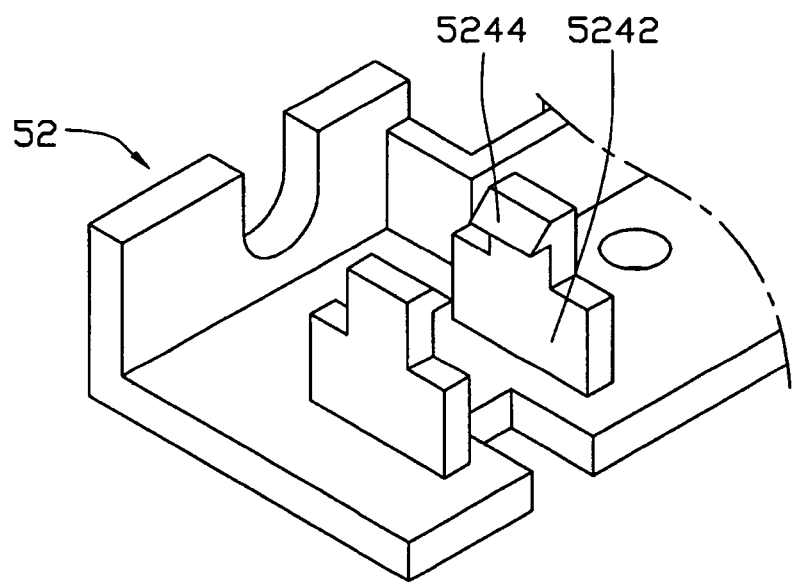
FIG. 5 is a schematic, partially isometric view of a lamp-fixing unit according to a second preferred embodiment.

Referring to FIG. 5, a lamp-fixing unit 52 in accordance with a second preferred embodiment, is similar in principle to the lamp-fixing unit 22, except that a shape of a pressing block 5244 extending out from a top of an elastic protruding wall 5242 is different. The pressing block 5244 has a triangular cross-section taken along a plane in a direction parallel to its extending direction that cuts through the center of each pressing block 5244.

Figure 6:
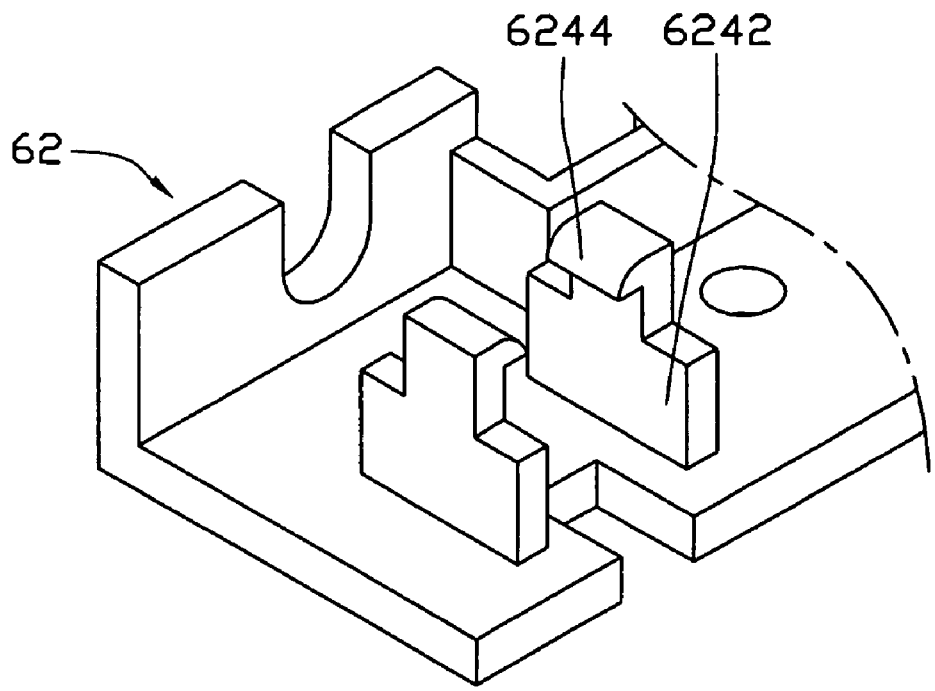
FIG. 6 is a schematic, partially isometric view of a lamp-fixing unit according to a third preferred embodiment.

Referring to FIG. 6, a lamp-fixing unit 62 in accordance with a third preferred embodiment, is similar in principle to the lamp-fixing unit 22, except that a shape of a pressing block 6244 extending out from a top of an elastic protruding wall 6242 is different. The pressing block 6244 has a falcate cross-section taken along a plane in a direction parallel to its extending direction that cuts through the center of each pressing block 6244.

Figure 7:
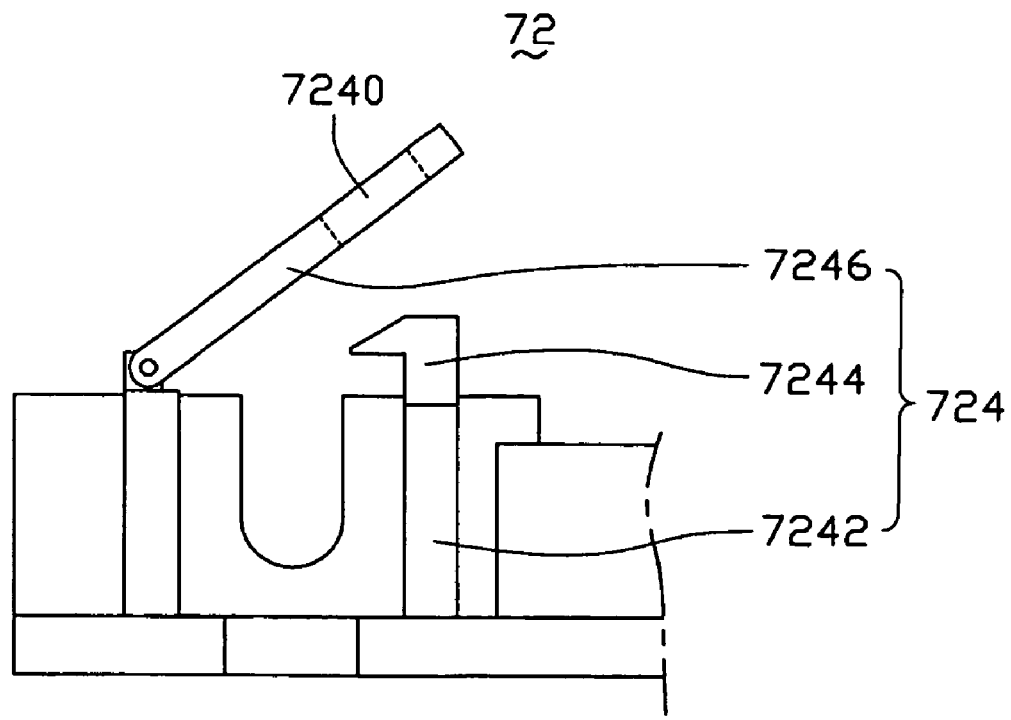
FIG. 7 is a schematic, partially side view of a lamp-fixing unit according to a fourth preferred embodiment.
Figure 8:
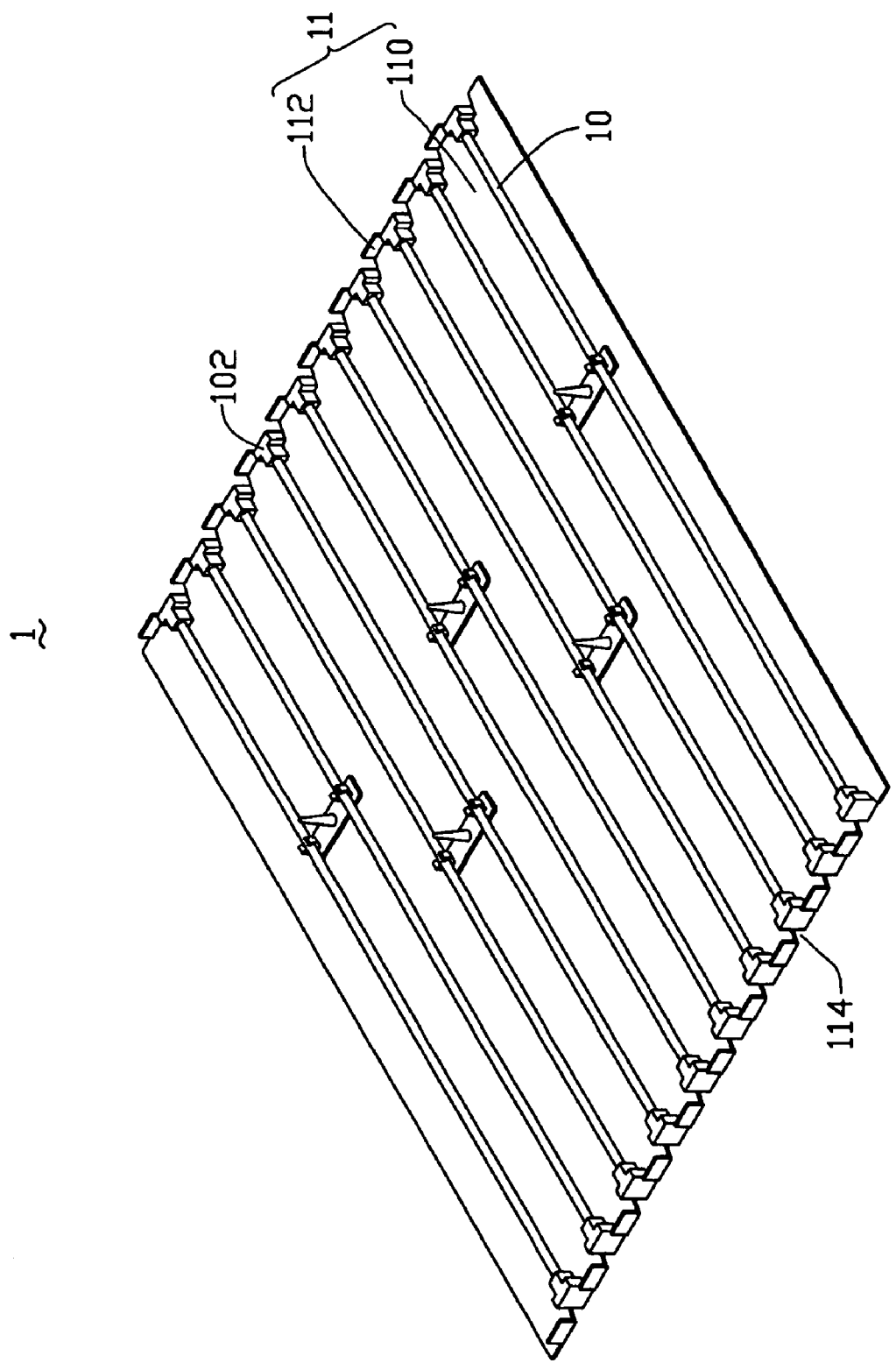
FIG. 8 is a schematic, isometric view of a conventional backlight module.

Referring to FIG. 7, a lamp-fixing unit 72 in accordance with a fourth preferred embodiment, is similar in principle to the lamp-fixing unit 22, except that each clip element 724 of the lamp-fixing unit 72 includes an elastic arm 7240 that is rotatable relative to one of elastic protruding wall 7242 and a pressing block 7244 extending from a top of the other elastic protruding wall 7242 towards the elastic arm 7240. The elastic arm 7240 defines a latching hole 7240 therein. In use, the pressing block 7244 can be engaged in the latching hole 7240 of the elastic arm 7240, so as to fix the lamp tubes (not shown) into the clip element 724.

It should be pointed out that the structure of clip elements of the present lamp-fixing unit is not limited to the illustrated embodiment. The clip element of the present lamp-fixing unit may include only one elastic protruding wall and only one pressing block extending from a top of the elastic protruding wall, should be considered to be within the scope of the present invention. The supporting sidewall of the present lamp-fixing unit can position and support the lamp tubes, and the only one pressing block can limit the lamp tubes to move along a direction perpendicular to the bottom board, thus the lamp tube can also be fixed in the present lamp-fixing unit tightly.

It is to be understood that the present backlight module can employ a number of lamp-fixing units connected with each other disposed at one end of the base. In the same way, the present backlight module can employ a number of lamp-protecting units connected with each other, covering the corresponding lamp-fixing units. Field emission linear lamps, or other linear light sources may also be used as light sources in the present backlight module.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A direct type backlight module comprising:
   a base;
   at least two lamp-fixing units disposed on two corresponding opposite ends of the base, each lamp-fixing unit having a bottom board mounted to the bases, at least one clip element formed on the bottom board; and
   at least one lamp tube having two electrodes defined at two ends thereof and two electrode holders receiving the two electrodes respectively, wherein the lamp tube with the electrode holders is secured in between the two aligned lamp-fixing units; the at least one clip element comprises two elastic protruding walls extending out from the bottom board, an arm that is rotatable relative to one of elastic protruding wall, and a pressing block extending from a top of the other elastic protruding wall towards the elastic arm, the elastic arm defining a latching hole therein, the pressing block being engaged in the latching hole for fixing the lamp tube into the clip element.

2. The direct type backlight module according to claim 1, wherein the lamp-fixing unit further comprises a supporting sidewall extending out from an inner edge of the bottom board, perpendicular to the bottom board, and at least one first U-shaped opening defined in the supporting sidewall according to the clip element, so as to support a corresponding lamp body of the lamp tube therethrough.

3. The direct type backlight module according to claim 1, wherein a distance between the two elastic protruding walls is equal to a width of the electrode holder, for fixing the lamp tube tightly and limiting the lamp tube to move horizontally between the two elastic protruding walls.

4. The direct type backlight module according to claim 1, wherein each pressing block has one of a trapezoid-form, a triangular and a falcate cross-sections taken along a plane in a direction parallel to its extending direction that cuts through the center of each pressing block.

5. The direct type backlight module according to claim 1, wherein a height of the pressing block relative to the bottom board is equal to that of the electrode holder, so as to limit the lamp tube to move along a direction perpendicular to the bottom board.

6. The direct type backlight module according to claim 1, wherein each electrode holder has a L-shaped structure having a main portion receiving the electrode of the lamp tube and a secondary portion connecting the main portion, a lead wire connecting the electrode of the lamp tube being drawn out from the secondary portion thereof.

7. The direct type backlight module according to claim 1, wherein each lamp-fixing unit further comprises a rectangular opening defined adjacent an outer edge of the bottom board between the two elastic protruding walls, so as to receive the secondary portion of the electrode holder.

8. The direct type backlight module according to claim 1, further comprising at least two lamp-protecting units covering the two lamp-fixing units respectively, each lamp-protecting unit having an upper board, a first sidewall and a second sidewall, the first sidewall and the second sidewall respectively connected with two opposite edges of the upper board.

9. The direct type backlight module according to claim 8, wherein an inclination angle defined by the first sidewall with respect to the upper board is configured to be an obtuse angle.

10. The direct type backlight module according to claim 8, wherein a surface facing an inner area of the base is a reflective surface.

11. The direct type backlight module according to claim 8, wherein the first sidewall defines a plurality of second U-shaped openings therein according to the lamp tube, the lamp-protecting unit covering the corresponding lamp-fixing unit substantially, except that the lamp tube passing through the second U-shaped openings.

12. The direct type backlight module according to claim 1, wherein the base further comprises a plurality of fixing columns disposed at two opposite ends thereof; each lamp-fixing unit further comprises a plurality of first positioning hole defined in the bottom board according to the fixing columns; each lamp-protecting unit further comprises a plurality of second positioning hole defined in the upper board according the fixing columns; and each lamp-protecting unit and each lamp-fixing unit are both fixed to the base tightly by mounting the fixing columns through the corresponding first positioning hole, and the fixing columns being locked with a plurality of screws through second positioning holes.

13. A direct type backlight module comprising:
   a base having two opposite base sides;
   two lamp-fixing units each attached to a corresponding one of the base sides, the lamp-fixing units being discrete elements prior to attachment to the base, each lamp-fixing unit forming a pair of clip portions, the clip portions being spaced from each other to cooperatively define a positioning space therebetween; and
   a lamp tube having two electrodes at two opposite ends thereof and two electrode holders receiving the two electrodes respectively, wherein each of the electrode holders is detachably mounted in said positioning spaced so as to fix the lamp tube relative to the base;
   wherein at least one of the clip portions is resilient and forms a barb at a top section thereof, an arm pivotably mounted on the other of the clip portions, the arm being pivotable to a locked position to lock the electrode holder in said positioning space; the barb releasably engages with the arm in a manner so as to retain the arm in said locked position, and the barb engages with a corresponding electrode holder in a manner so as to prevent the electrode holder from retreating from said positioning space.

14. The direct type backlight module of claim 13, wherein the barb forms an inclined guide surface configured for facilitating moving of the electrode holder into said positioning space.

* * * * *